May 6, 1969   W. R. KOTOUCEK   3,442,154
HIGH TRACTION DIFFERENTIAL GEAR UNIT FOR WHEELED VEHICLES
Filed June 28, 1967

INVENTOR:
WALDEMAR R. KOTOUCEK
ATTORNEYS

May 6, 1969 W. R. KOTOUCEK 3,442,154
HIGH TRACTION DIFFERENTIAL GEAR UNIT FOR WHEELED VEHICLES
Filed June 28, 1967

INVENTOR:
WALDEMAR R. KOTOUCEK
BY
ATTORNEYS

United States Patent Office 3,442,154
Patented May 6, 1969

3,442,154
HIGH TRACTION DIFFERENTIAL GEAR UNIT FOR WHEELED VEHICLES
Waldemar R. Kotoucek, Detroit, Mich., assignor to Ford Motor Company, Dearborn, Mich., a corporation of Delaware
Filed June 28, 1967, Ser. No. 649,688
Int. Cl. F16h 1/44
U.S. Cl. 74—710.5                           5 Claims

ABSTRACT OF THE DISCLOSURE

A positive traction, limited slip differential gear unit having a carrier, a pair of side gears, each side gear being connected to one of two aligned axle shafts, differential pinions carried by the carrier in meshing engagement with the side gears, and a torque bias clutch connecting the carrier to one of the side gears, said clutch comprising a cam plate which carries cam balls and a cam ring supported by a ring of yieldable material which permits restrained relative motion between the cam plate and the side gear thereby establishing a torque bias.

General description of the invention

This specification discloses a positive-drive, limited-slip differential gear unit for use in the driveline of an automotive vehicle. It includes a differential carrier which encloses a pair of differential side gears, one side gear being connected to one axle shaft and the other side gear being connected to a second axle shaft. A torque bias is maintained in the differential gearing regardless of loss of traction for the traction wheel associated with one axle shaft. This is done by means of a cam structure having relatively yieldable cam elements, one cam element being drivably coupled to the differential carrier and the other cam element being drivably coupled to one of the side gears.

When the carrier and the side gear tend to rotate at different speeds, camming action takes place between the cam elements thereby locking the side gear to the carrier with a predetermined locking force. After a predetermined torque bias is developed, the cam elements yield with respect to each other thereby permitting an overrunning action.

If one traction wheel should lose traction with respect to the other, there exists a normal tendency for the torque flow path from the engine to the traction wheels to be interrupted since the wheel with the higher coefficient of friction loses tractive effort as the other wheel spins uncontrollably on the low friction surface. It is conventional practice with limited slip differentials in environments of this type to use a friction clutch between one of the side gears and the differential carrier so that uncontrolled spinning motion of the wheel with the lower coefficient of friction occurs only after the torque bias on the clutch is overcome. It is possible, therefore, for a portion of the engine driving torque to be delivered to the higher traction wheel under these conditions, the amount of the torque to be delivered to the latter wheel being determined by the clutching capacity of the clutch elements.

The friction discs in such designs of necessity must be in constant frictional engagement. Thus, during the normal operation of the differential gearing as the vehicle maneuvers either in a right-hand direction or a left-hand direction, the friction elements of the clutch must slip relative to each other. This introduces a wear problem that causes the friction discs to fail after a relatively short time. This makes periodic maintenance necessary, and the manufacturing and servicing costs are relatively high.

The improvement of my invention eliminates the need for friction coupling elements of this type. It instead employs a yieldable cam lock which will permit normal torque delivery from the differential carrier to each of the two axle shafts through the differential gearing, but which will accommodate overrunning motion of the cam structure during turning maneuvers of the vehicle. If one traction wheel should lose traction, the normal tendency of the associated side gear to overspeed with respect to the other is inhibited because of the camming action that occurs between the cam elements. This introduces a torque bias that will permit torque distribution to the traction wheel with the higher coefficient of friction.

When the torque bias is exceeded during normal operation, the camming elements will permit differential motion of the gearing as one yields with respect to the other. One cam element is in the form of a cam disc carried by the side gear, the disc comprising a yieldable annulus. The cam surfaces of the cam disc register with cam elements that are carried by a coupling race which in turn is splined directly to the differential carrier. When the predetermined torque bias is exceeded, the cam disc will yield thereby permitting the cam elements to override the cam surfaces on the cam disc.

Particular description of the invention

Figure 1:
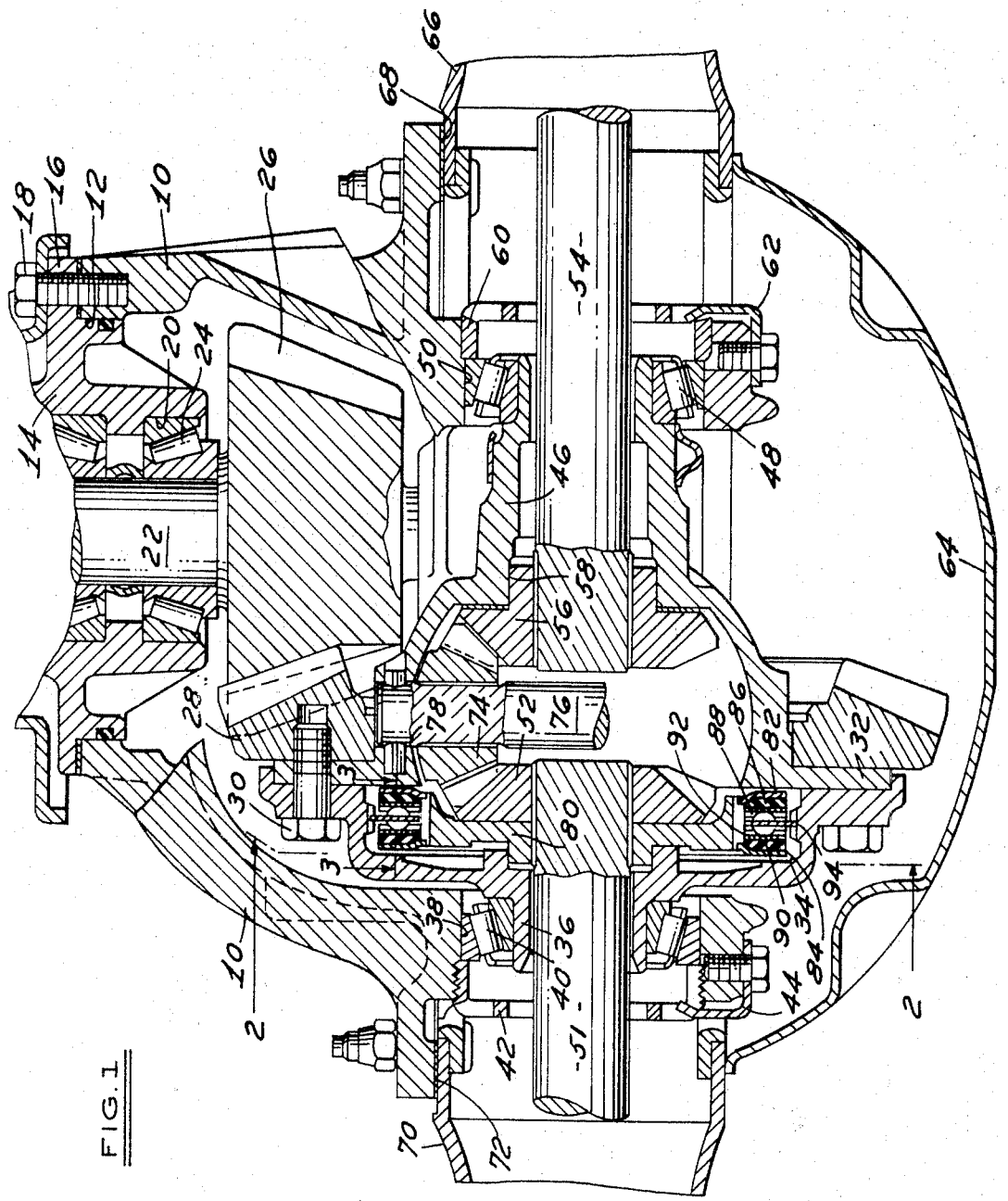
FIGURE 1 shows in transverse cross sectional form a differential gear unit embodying improvements of my invention.

In FIGURE 1 numeral 10 designates a differential housing. An inlet opening 12 receives a bearing adaptor 14. The margin 16 of the adaptor 14 is bolted by bolts 18 to the housing 10. Adaptor 14 includes an opening 20 through which a main shaft 22 is received. The shaft 22 is journaled within the opening 20 by paired tapered roller bearings 24.

A power input bevel pinion 26 is carried by the shaft 22. It drivably engages a differential ring gear 28 which is bolted by bolts 30 to the periphery of differential carrier housing part 32. This housing part 32 cooperates with a second housing part 34 to define an interior carrier chamber. Housing parts 32 and 34 are joined together on the bolts 30.

The hub of carrier housing part 34 is in the form of a sleeve 36 which extends through bearing opening 38 formed in the housing 10. Sleeve 36 is journaled in the opening 38 by tapered roller bearings 40. A spanner nut 42 threadably received within the opening 38 axially positions and retains the outer race of the bearing 40. The nut 42 is locked in place by a locking element 44.

The right-hand end of the housing part 32 is extended to form a sleeve 46 which is journaled by means of tapered roller bearing 48 within bearing opening 50. The opening 50 is formed in housing 10 in axial alignment with respect to opening 38.

A first axle shaft 51 is splined to a first differential side gear 52. A second axle shaft 54 is splined to a second differential side gear 56. Gear 56 includes a hub that is piloted within pilot opening 58 formed in housing part 32. Spanner nut 60, which is engageable with the outer race of bearing 48, axially positions the carrier assembly in cooperation with spanner nut 42. Locking element 62 prevents rotation of the externally threaded spanner nut 60 following assembly.

An access opening in the rearward end of the housing 10 is covered by a stamped, steel cover plate 64. An axle shaft extension housing 66 is received within an end opening 68 in the housing 10. It surrounds the axle shaft 54 and extends transversely to a wheel brake mounting plate adjacent one traction wheel. A corresponding axle shaft extension housing 70 is received within opening 72 formed on the other side of the housing 10. It surrounds axle shaft 51 and it carries at its outboard end a wheel brake mounting plate for the other traction wheel.

Figure 3:
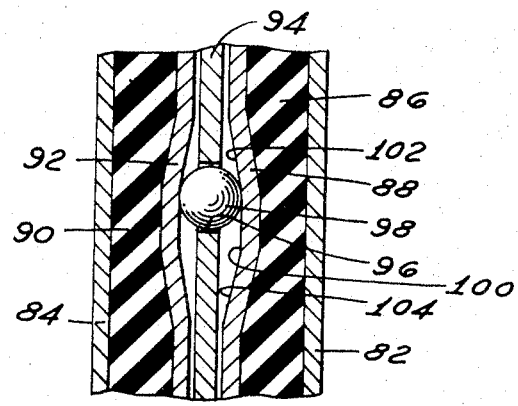
FIGURE 3 is a schematic view taken along the section line of 3—3 of FIGURE 1 showing in detail the relationship of the cam element viewed in the structure of FIGURE 1.

Side gear 52 meshes continuously with a pair of differential bevel pinions, one of which is shown at 74. These are journaled rotatably on a pinion shaft 76 which in turn is secured within aligned openings in the housing part 32, one opening being shown at 78. Situated adjacent side gear 52 is a clutch element 80 which is internally splined to the inboard end of the shaft 51. The outer periphery of the clutch element 80 is splined to permit a splined connection with a pair of internally splined annular discs 82 and 84. An annular rubber ring 86 is bonded to the disc 82, and a cam ring or a cam plate 88 is bonded to the other side of ring 86. This arrangement is best seen in FIGURE 3.

An annular rubber ring 90 is bonded to the disc 84 and it also is formed with a cam ring or a cam plate 92 which is bonded to the opposite side of the ring 90. Located between the cam plates 92 and 88 is a clutch ring 94 having apertures 96 which receive cam balls 98. These balls register with cam recesses 100 formed in the cam plate 88 and in the cam plate 92. Cam recesses 100 each include a pair of cam surfaces 102 and 104 which register with balls 98 when the ring 94 is displaced angularly with respect to the cam plates 88 and 92.

The rings 86 and 90, which form in part a so-called "annular sandwich," preferably are formed of a polyacrylic rubber material having a hardness of approximately 55 durometer. By preference, the depth of the cam recesses 100 is about 1/16 of an inch and the elastic modulus of the rubber is about 2500 p.s.i.

During normal straight-ahead driving, the side gears rotate with the carrier housing and no camming action occurs. If one wheel should lose traction, however, the normal tendency of the traction wheel of low coefficient of friction to slip is retarded by the camming action that occurs as the speed of rotation of side gear 52 changes with respect to the speed of the carrier housing. A torque bias thus is introduced into the system as the balls of the camming construction engage the ramps of the cam recesses 100.

During normal turning maneuvers of the vehicle with each traction wheel riding on a high friction surface, relative motion occurs between the side gears. The cam arrangement under these conditions will allow the balls to ride over the ramps of the cam plates as the rubber rings 90 and 86 yield. This produces an overrunning motion of the cam plate 94 with respect to the cam plates 92 and 88. A predetermined torque bias is necessary, however, before such overrunning motion is initiated. It is this same torque bias that permits torque distribution to the traction wheel of a higher tractive effort when the other traction wheel engages a low friction surface.

The modulus of the rubber material of rings 86 and 90 can be chosen to produce a desired torque bias. The rubber is chosen also to provide the necessary corrosion resistance due to the presence of oil in the interior of the differential carrier housing.

Figure 4:
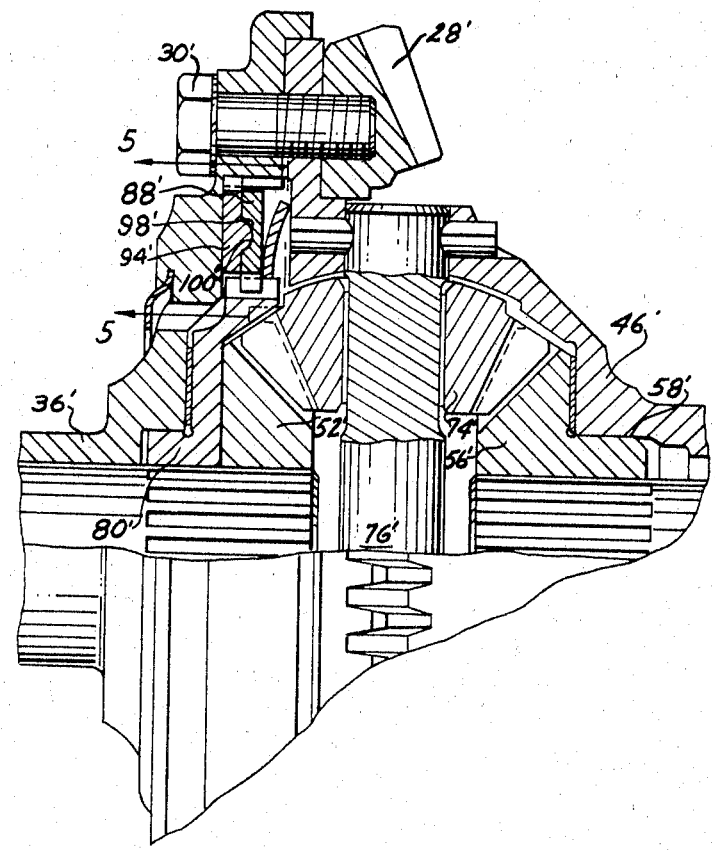
FIGURE 4 is a modified form of my invention.
Figure 5:
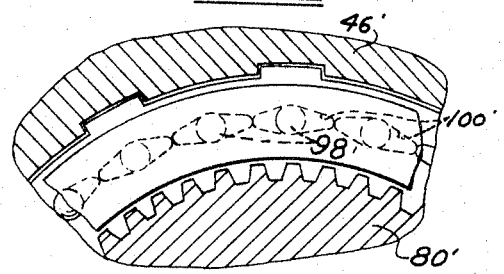
FIGURE 5 is a partial side elevation view of the cam disc and coupling race for the structure shown in FIGURE 4.

In FIGURES 4 and 5 I have shown an alternate construction with the rubber replaced by an annular Belleville-type spring. Also the disc 94 and balls 98 are replaced by cam plate 94' which has fixed cam projections 98' that engage the recesses 100' in cam ring 88'. Disc 94' is connected to the carrier housing and ring 88' is connected to one of the side gears.

Figure 2:
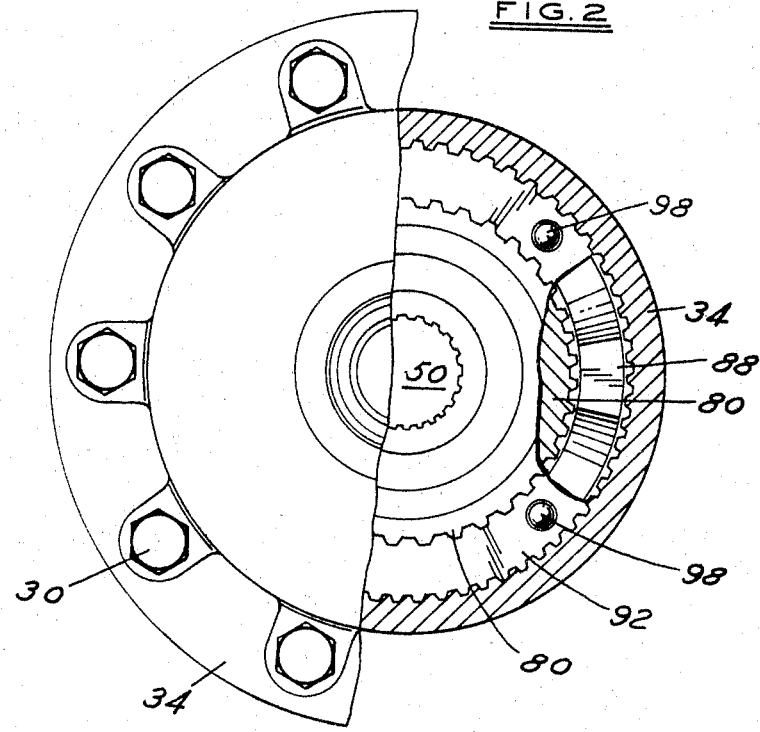
FIGURE 2 is a cross sectional view taken along the plane of section line 2—2 of FIGURE 1.

The elements of FIGURES 4 and 5 that have counterpart elements in the construction of FIGURES 1, 2 and 3 have been identified by similar reference characters, but prime notations are added.

Having thus described preferred forms of my invention, what I claim and desire to secure by U.S. Letters Patent is:

1. A limited-slip differential mechanism comprising a power input gear, a differential carrier, a ring gear carried by said carrier engaging said power input gear, two differential side gears in said carrier, a first power output shaft connected to one side gear, a second power output shaft connected to the other side gear, differential pinions engaging said side gears, said pinions being journaled rotatably on said carrier, cam clutch structure including a first clutch element and a cam plate drivably connected to said first output shaft, a second clutch element in the form of a clutch plate connected drivably to said carrier, a cam element carried by said clutch plate, said cam plate having a cam surface formed thereon which registers with said cam element, a yieldable clutch ring adjacent the cam plate and adapted to yield under the influence of cam forces developed by said cam element on said cam surface as said first side gear rotates with respect to said carrier whereby a torque bias is introduced into said differential mechanism that will effect torque distribution to each output shaft regardless of the ratio of the loads on said shafts.

2. The combination as set forth in claim 1 wherein said yieldable member is in the form of an annular rubber ring and said cam plate is moulded to said rubber ring, said cam plate having opposed cam surfaces in said cam recess which register with said cam element regardless of the direction of relative rotation of said first pinion with respect to said carrier.

3. The combination as set forth in claim 2 wherein said cam clutch structure includes a clutch ring drivably connected to said first output shaft and bonded to one side of said annular ring whereby a driving connection is established between said cam plate and said first output shaft.

4. The combination as set forth in claim 3 wherein said clutch ring is situated directly adjacent a portion of said carrier whereby the cam forces acting upon said annular ring are distributed directly to said carrier.

5. The combination as set forth in claim 1 wherein said cam structure includes a pair of sandwiched elements, each sandwiched element comprising an annular rubber ring and a cam plate with at least one cam recess, said cam plate being bonded to said rubber ring and being situated directly adjacent said clutch plate whereby said clutch elements register with the cam recesses in said cam plates, and a clutch ring bonded to one side of each annular ring, said clutch plates being drivably connected to said first output shaft.

References Cited

UNITED STATES PATENTS

| | | | |
|---|---|---|---|
| 1,585,140 | 5/1926 | Erban | 192—93 X |
| 2,045,086 | 6/1936 | Kastner | 192—93 X |
| 2,778,246 | 1/1957 | Thornton | 74—711 |
| 3,037,860 | 6/1962 | Masterson et al. | 192—107 X |
| 3,118,292 | 1/1964 | Schroter et al. | 192—54 X |
| 3,184,002 | 5/1965 | Klaue | 192—93 X |
| 3,211,022 | 10/1965 | Anderson | 74—711 |
| 3,270,846 | 9/1966 | Arledter et al. | 192—107 |
| 3,369,428 | 2/1968 | Hughson | 74—710.5 |

ARTHUR T. McKEON, *Primary Examiner.*

U.S. Cl. X.R.

192—107